(12) United States Patent
Couwenhoven et al.

(10) Patent No.: US 7,822,256 B2
(45) Date of Patent: Oct. 26, 2010

(54) METHOD FOR RENDERING DIGITAL RADIOGRAPHIC IMAGES FOR DISPLAY BASED ON INDEPENDENT CONTROL OF FUNDAMENTAL IMAGE QUALITY PARAMETERS

(75) Inventors: Mary E. Couwenhoven, Fairport, NY (US); Robert A. Senn, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 147 days.

(21) Appl. No.: 12/180,589

(22) Filed: Jul. 28, 2008

(65) Prior Publication Data

US 2008/0279440 A1 Nov. 13, 2008

Related U.S. Application Data

(63) Continuation of application No. 11/781,975, filed on Jul. 24, 2007, now Pat. No. 7,492,939, which is a continuation of application No. 10/625,964, filed on Jul. 24, 2003, now Pat. No. 7,266,229.

(51) Int. Cl.
    *G06K 9/00* (2006.01)
(52) U.S. Cl. .................................. 382/132; 382/260
(58) Field of Classification Search .................. 382/132, 382/260
    See application file for complete search history.

(56) References Cited

U.S. PATENT DOCUMENTS

| | | | |
|---|---|---|---|
| 5,467,404 A | 11/1995 | Vuylsteke et al. |
| 5,644,662 A | 7/1997 | Vuylsteke |
| 5,805,721 A | 9/1998 | Vuylsteke et al. |
| 5,978,518 A | 11/1999 | Oliyide et al. |
| 6,069,979 A | 5/2000 | VanMetter |
| 6,072,913 A | 6/2000 | Yamada |
| 6,167,165 A | 12/2000 | Gallagher et al. |
| 6,424,730 B1 | 7/2002 | Wang et al. |
| 6,480,300 B1 | 11/2002 | Aoyama |

(Continued)

OTHER PUBLICATIONS

Richard Van Metter et al., Enhanced latitude for digital projection radiography, SPIE, SanDiego, CA, Feb. 1999, vol. 3658, pp. 468-483.

(Continued)

*Primary Examiner*—John B Strege (57) ABSTRACT

A system for enhancing a digital image. The system includes: means for providing a digital image; means for decomposing the provided digital image into a multi-frequency band representation of four frequency bands as follows: a lowest frequency band image which represents large-sized features in the digital image; a low-to-mid frequency band image which represents mid-sized features of the digital image; a mid-to-high frequency band image which represents the small-sized features in the digital image; and a highest frequency band which represents very fine detail in the digital image; means for manipulating said low-to-mid frequency band image to produce a contrast effect without affecting the overall dynamic range of said digital image; means for multiplying each of said high-frequency band images with a gain factor; means for summing together said unmodified low frequency band image and said modified high-frequency band images to produce a reconstructed digital image; and means for mapping said reconstructed digital image through a tone-scale look-up table to map said reconstructed digital image to optical densities.

15 Claims, 11 Drawing Sheets

U.S. PATENT DOCUMENTS

| | | | |
|---|---|---|---|
| 7,079,700 | B2 | 7/2006 | Shinbata |
| 7,266,229 | B2 * | 9/2007 | Couwenhoven et al. ..... 382/132 |
| 7,492,939 | B2 * | 2/2009 | Couwenhoven et al. ..... 382/132 |
| 2001/0017619 | A1 | 8/2001 | Takeuchi |
| 2003/0112374 | A1 | 6/2003 | Wang et al. |
| 2003/0179945 | A1 | 9/2003 | Akahori |

OTHER PUBLICATIONS

R.F. Bessler et al., Contrast Enhancement Using Burt Pyramid Processing, SID 86 Digest, 1986, pp. 352-353, 19.3.

A. Polesel et al., Adaptive Unsharp Masking for Contrast Enhancement, 1997 IEEE, pp. 267-270.

Martin Stahl et al., Digital radiography enhancement by nonlinear multiscale processing, Med. Phys. 27 (1), Jan. 2000, pp. 56-65.

Mary Couwenhoven et al., Enhancement method that provides direct and independent control of fundamental attributes of image quality for radiographic imagery, Medical Imaging 2004-SPIE vol. 5367, pp. 474-481.

Steffen Hoppner, Ingo Maack, Ulrich Neitzel, Martin Stahl, Philips Medical Systems, "Equalized Contrast Display Processing for Digital Radiography", Medical Imaging 2002, Visualization, Image-Guided Procedures, and Display, SPIE, vol. 4681, pp. 617-625.

* cited by examiner

DETAIL CONTRAST

FIG. 7a

SHARPNESS

FIG. 7b

FINE DETAIL

METHOD FOR RENDERING DIGITAL RADIOGRAPHIC IMAGES FOR DISPLAY BASED ON INDEPENDENT CONTROL OF FUNDAMENTAL IMAGE QUALITY PARAMETERS

CROSS REFERENCE TO RELATED APPLICATIONS

This is a continuation of commonly assigned application U.S. Ser. No. 11/781,975, entitled "METHOD FOR RENDERING DIGITAL RADIOGRAPHIC IMAGES FOR DISPLAY BASED ON INDEPENDENT CONTROL OF FUNDAMENTAL IMAGE QUALITY PARAMETERS" filed on 24 Jul. 2007 now U.S. Pat. No. 7,498,939, which is a continuation of commonly assigned application U.S. Ser. No. 10/625,964, which issued as U.S. Pat. No. 7,266,229 entitled "METHOD FOR RENDERING DIGITAL RADIOGRAPHIC IMAGES FOR DISPLAY BASED ON INDEPENDENT CONTROL OF FUNDAMENTAL IMAGE QUALITY PARAMETERS", filed on 24 Jul. 2003 in the names of Mary E. Couwenhoven et al., and which is assigned to the assignee of this application.

FIELD OF THE INVENTION

This invention relates in general to image enhancement in digital image processing and in particular, to a method of image enhancement to be used in a medical radiographic imaging system, such as a computed radiography system.

BACKGROUND OF THE INVENTION

It is a common desire to enhance images acquired from imaging devices to improve their image quality. There are fundamental attributes that govern the image quality of a grayscale image. These attributes are the brightness of an image, the dynamic range of an image, the contrast of detail in an image (or detail contrast), the sharpness of edges in an image, and the appearance of noise in an image. It is beneficial to provide a system that enables direct and independent control of these attributes of image quality. Further a system, which enables the control of the detail contrast, sharpness, and noise appearance in a density dependent fashion is also beneficial.

U.S. Pat. No. 5,805,721, inventors P. Vuylsteke and E. Schoeters, entitled "Method and Apparatus for Contrast Enhancement", issued Sep. 8, 1998 describes a multi-resolution method for enhancing contrast with increased sharpness that includes dynamic range compression, and enhancing contrast without remarkably boosting the noise component. The described invention enhances detail contrast and sharpness via a multi-resolution method and controls dynamic range compression with a gradation curve to map the processed image into the appropriate dynamic range for the display. Application of the gradation curve will impact both the apparent detail contrast and dynamic range of the displayed image. Hence, both the modifying functions of the multi-resolution processing and the shape of the gradation curve affect the detail contrast in the image. This requires that both be adjusted when setting the detail contrast in the image.

U.S. Pat. No. 5,978,518, inventors Oliyide et al., entitled "Image Enhancement in Digital Image Processing", issued Nov. 2, 1999 and U.S. Pat. No. 6,069,979 (continuation-in-part of U.S. Pat. No. 5,978,518), inventor VanMetter, entitled "Method for Compressing the Dynamic Range of Digital Projection Radiographic Images", issued May 30, 2000, describe a multi-resolution method for performing dynamic range modification and high-frequency enhancement (including detail contrast). The methods include a tone scale look-up-table that is used to map the image for display rendering. A tone scale look-up-table impacts the dynamic range and contrast of detail in an image. Hence, in this method, the dynamic range and detail contrast of the image depends on both the settings of the frequency modification and the parameters of the tone scale look-up table. It is desirable, instead to have a single set of parameters that control these attributes independently.

U.S. Pat. No. 6,072,913, inventor M. Yamada, entitled "Image Processing Method and Apparatus", issued Jun. 6, 2000, describes a multi-resolution method for enhancing frequencies with dynamic range compression. The described invention requires the definition of many functions to control the performance of the algorithm. It does not disclose a set of parameters that directly and independently control all of the fundamental attributes of image quality.

Thus, there is a need for a method that can be applied to an image, the parameters of which provide direct and independent control of the above stated fundamental attributes of image quality.

SUMMARY OF THE INVENTION

According to the present invention, there is provided a solution to the problems and fulfillment of the needs discussed above by means of a method of digital image enhancement, especially image enhancement of medical diagnostic (radiographic) digital images.

According to a feature of the present invention, there is provided a method for enhancing an image: providing a digital image; decomposing the image into a multi-frequency band representation including a low frequency band image and multiple different high frequency band images; multiplying each of the high frequency band images with a gain factor; summing together the unmodified low frequency band image and the modified high-frequency band images to produce a reconstructed digital image: and mapping the reconstructed image through a tone scale look-up-table to map it to optical densities.

ADVANTAGEOUS EFFECT OF THE INVENTION

The invention has the following advantages.

1. A method for independently controlling fundamental attributes of image quality of a digital image.
2. A method for controlling detail contrast, sharpness, and noise appearance as a function of log exposure of a digital image is provided.
3. A method for density-dependent control of detail contrast, sharpness and noise appearance of a digital image is provided.

DETAILED DESCRIPTION OF THE INVENTION

Reference is made to U.S. Ser. No. 11/781,973, entitled "METHOD FOR RENDERING DIGITAL RADIOGRAPHIC IMAGES FOR DISPLAY BASED ON INDEPENDENT CONTROL OF FUNDAMENTAL IMAGE QUALITY PARAMETERS", filed on Jul. 24, 2003 in the names of Mary E. Couwenhoven et al., and which is assigned to the assignee of this application, which is itself a divisional of U.S. Ser. No. 10/625,964, which issued as U.S. Pat. No. 7,266,229 entitled "METHOD FOR RENDERING DIGITAL RADIOGRAPHIC IMAGES FOR DISPLAY BASED ON INDEPENDENT CONTROL OF FUNDAMENTAL IMAGE QUALITY PARAMETERS", filed on 24 Jul. 2003 in the names of Mary E. Couwenhoven et al., and which is assigned to the assignee of this application.

Figure 1:
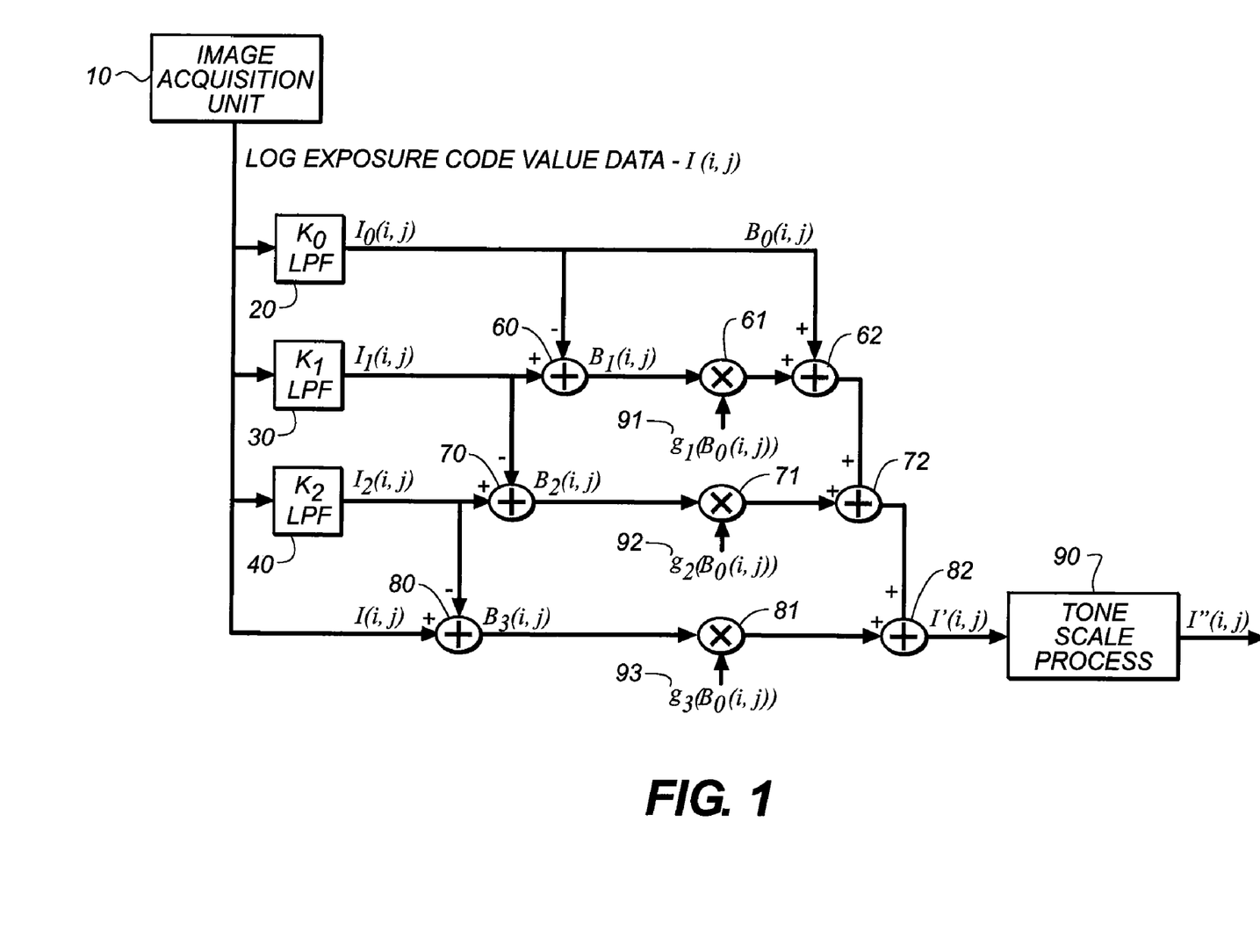
FIG. 1 is a flow diagram of an embodiment of the present invention.

Referring now to FIG. 1, there is shown a block diagram of the present invention. A digital image in which code value is linearly related to log exposure is captured with an image acquisition unit 10. Unit 10 can be for example, a medical image acquisition unit such as, a diagnostic image unit (MRI, CT, PET, US, etc.), a computed radiography or direct digital radiography unit, an x-ray film digitizer, or the like. Any other digital image acquisition unit can also be used). The present invention processes the log exposure code value data, as shown in FIG. 1, accordingly, the digital image data is split into four frequency bands $B_0(i,j)$, $B_1(i,j)$, $B_2(i,j)$, and $B_3(i,j)$. The log exposure code value data $I(i,j)$ of the input digital input digital image is first processed by three different low-pass filter operators 20, 30, 40. Each operator uses a square-wave filter. It will be evident to those skilled in the art that other low-pass filter shapes such as a triangle-filter can be used. The filter kernel sizes are chosen to manipulate different sized features (or different frequency ranges) in the image. The first low-pass filter operator 20 uses kernel $K_0$. This operator uses the largest kernel size and it passes only the lowest frequencies. It generates the low-pass image $I_0(i,j)$. The next low-pass operator 30 uses kernel $K_1$. This operator uses the next largest kernel size and it passes the low to mid frequencies. It generates the low-pass image $I_1(i,j)$. The final low-pass operator 40 uses kernel $K_2$. This operator uses the smallest kernel size and it passes all frequencies except for the very highest. It generates the low-pass image $I_2(i,j)$. The low-pass images are used to generate the frequency bands. The lowest frequency band image is $B_0(i,j)$ and is equal to $I_0(i,j)$. This band represents large-sized features in the image (and contains the lowest frequencies). Manipulation of this band produces a change in dynamic range or latitude. The next frequency band $B_1(i,j)=I_1(i,j)-I_0(i,j)$ is generated by subtractor 60. This band contains the low-to-mid frequencies and represents mid-sized features in the image. Manipulation of this band produces a contrast effect without affecting the overall dynamic range. The next frequency band $B_2(i,j)=I_2(i,j)-I_1(i,j)$ is generated by subtractor 70. This band contains the mid-to-high frequencies and represents the small-sized features in the image. Manipulation of this band produces a sharpness or blurring effect of the small-sized features. The next frequency band $B_3(i,j)=I(i,j)-I_2(i,j)$ is generated by subtractor 80. This band contains the highest frequencies in the image and represents very fine detail in the image. Manipulation of this band produces a sharpness or blurring effect of very fine detail in the image.

As shown further in FIG. 1, the higher frequency bands $B_1(i,j)$, $B_2(i,j)$, and $B_3(i,j)$ are multiplied by respective gain terms 91, 92, 93 by respective multipliers 61, 71, 81 and summed together (adders 62, 72, 82) with the lowest frequency band image $B_0(i,j)$ to generated the reconstructed image using I'. The reconstructed image I' is defined as $$I'(i,j)=B_0(i,j)+g_1(B_0(i,j))*B_1(i,j)+g_2(B_0(i,j))*B_2(i,j)+g_3(B_0(i,j))*B_3(i,j)$$

If the bands are not manipulated, that is if $g_1(B_0(i,j))=g_2(B_0(i,j))=g_3(B_0(i,j))=1.0$, the reconstructed image I' is equal to the original image I, i.e., $I'(i,j)=I(i,j)$.

As shown in FIG. 1 the reconstructed image I' is mapped through a tone scale (TS) process 90 which maps the values into the desired display range. The output image is represented as $I''(i,j)=TS(I'(i,j))$.

Figure 2:
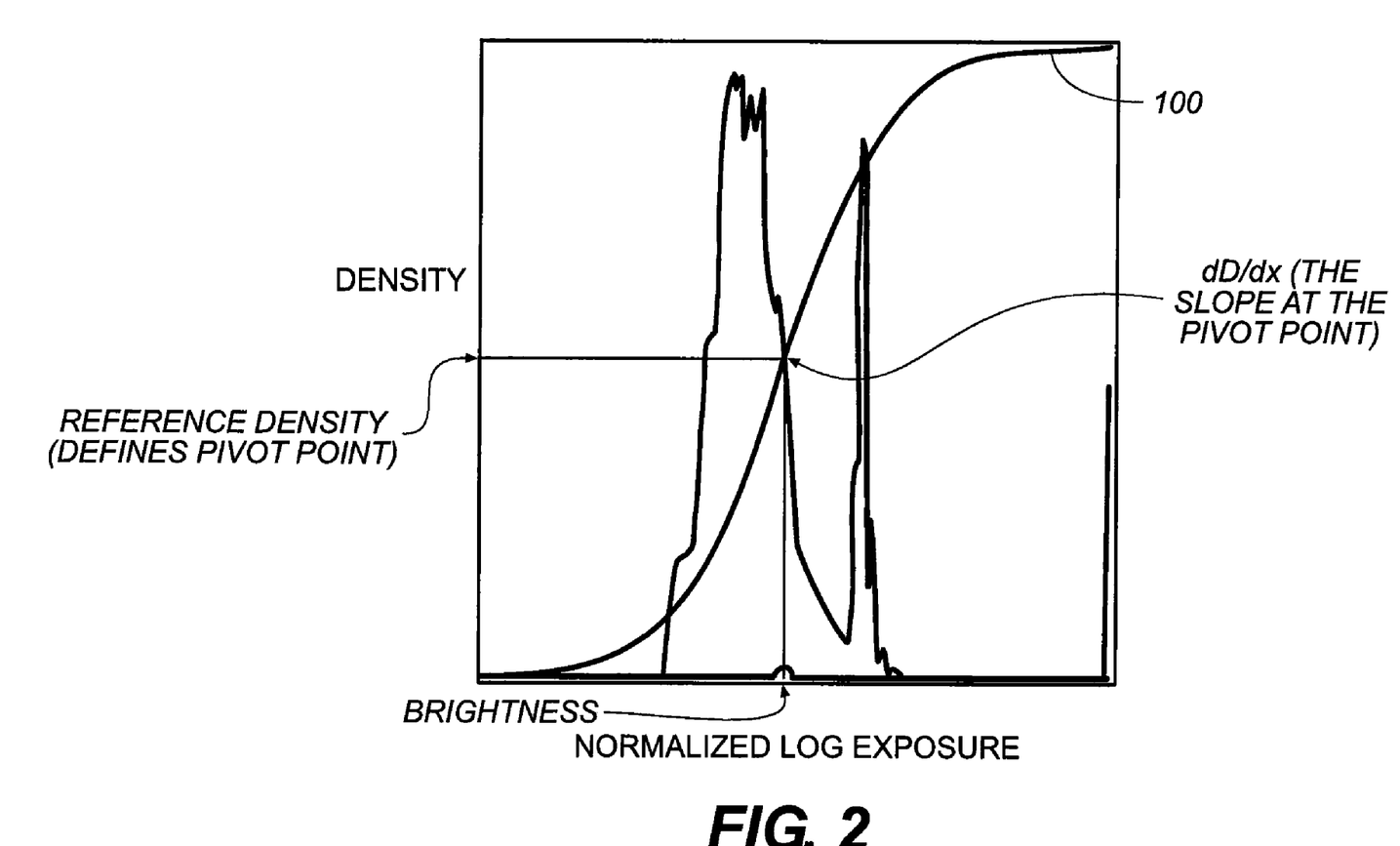
FIG. 2 is a graphical view showing an example of tone scale function and parameters useful in explaining the present invention.

FIG. 2 shows an example of a tone scale function 100 used to map log exposure (x-axis) to optical density (y-axis). It is a sigmoid shape and is parameterized by the minimum density and maximum density, the reference density (or pivot point), the brightness (or shift of tone scale along the log exposure axis relative to the pivot point), and the slope, $$\frac{dD}{dx},$$

about the reference density. The reference density maps the log exposure value that will remain invariant when the slope of the tone scale is varied. The brightness control is used to shift the mean density of the image. The brightness control defines the log exposure code value that is mapped via the tone scale to the reference density.

Figure 3:
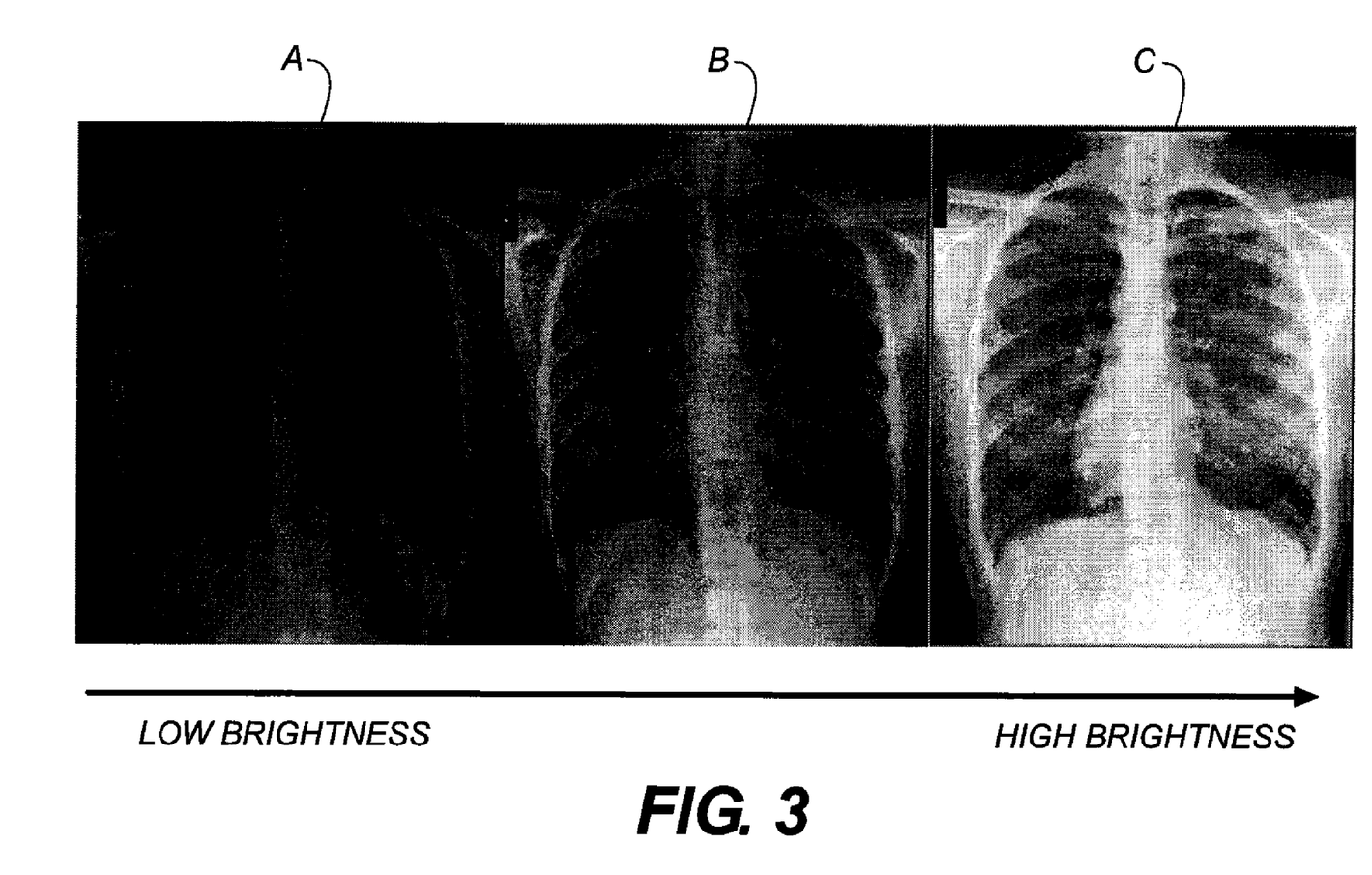
FIG. 3 is a diagrammatic view illustrating the brightness control used in the present invention.

FIG. 3 shows the effect of the brightness control (Image A to Image C). Increasing the brightness control lowers the mean density of the image (Image C is lower in mean density than Image A) (or increases the brightness of the image), while decreasing the brightness control raises the mean density of the image (or darkens the image). In a preferred embodiment, the tone scale function is further mapped to a standard gray scale display function (as specified by the Medical Image Standard format DICOM PART 10) for monochrome image presentation. This facilitates the same gray scale rendering between softcopy (video monitor) systems and between softcopy and hardcopy (film, paper) systems.

Figure 4:
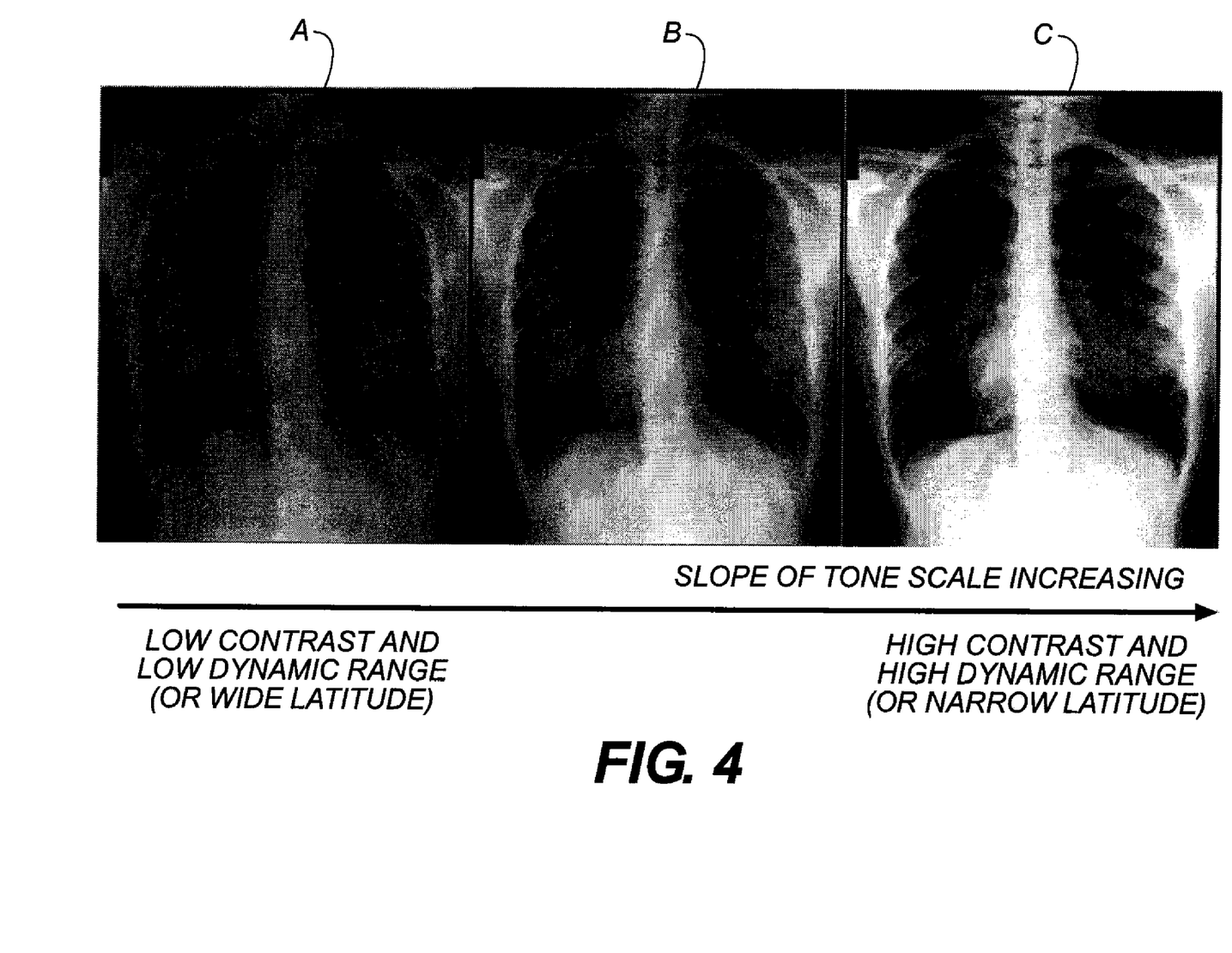
FIG. 4 is a diagrammatic view illustrating the effect of increasing the slope of the tone scale useful in explaining the present invention.

The amount of contrast in which the mid size detail in an image is rendered is defined as the detail contrast. In traditional screen film radiographic imaging systems, there is an inherent tradeoff between detail contrast and latitude (or range of log exposure that are rendered to unique densities). In these systems, if the contrast is increased, the latitude is decreased (or image dynamic range is increased). Likewise, if the latitude is increased, (or image dynamic range decreased) the detail contrast is decreased. The same is true if the image dynamic range and detail-contrast are controlled via a digital enhancement process (e.g., multi-resolution decomposition) in which the output of the process is mapped through a tone scale to render it to the display. Inherently, the tone scale also modifies both the dynamic range and detail contrast of an image. As shown in FIG. 4, from image A to image C as the slope of the tone scale increases both the image dynamic range and detail-contrast are increased and the latitude is decreased. Unless the digital enhancement process accounts for the tone scale effects both the dynamic range and detail-contrast of the image will be affected upon display.

In the embodiment of the present invention, shown in FIG. 1, the lowest frequency band of the multi-resolution decomposition is $B_0(i,j)$. If this band is manipulated it affects the dynamic range of the image. As previously discussed, the slope of the tone scale, $$\frac{dD}{dx},$$

also affects the dynamic range. According to the present invention, the lowest band is not manipulated for dynamic range control; instead, the slope of the tone scale is used. The dynamic range control is defined as the slope of the tone scale, dynamicRange=dD/dx at the reference density. Increasing the dynamic range reduces the latitude while decreasing the dynamic range increases the latitude.

Manipulation of band $B_1(i,j)$ affects the detail contrast of the image. According to the present invention, band $B_1(i,j)$ is multiplied by the gain term $g_1(B_0(i,j))$ at multiplier 61. As previously discussed, the slope of the tone scale also affects the detail contrast of the image. To account for the fact that both the slope of the tone scale $$\frac{dD}{dx}$$

and the gain term $g_1(B_0(i,j))$ affect the detail contrast, a detail contrast control is defined as:

detailContrast($B_0(i,j)$)=$g_1(B_0(i,j))$*(dD/dx).

Figure 5:
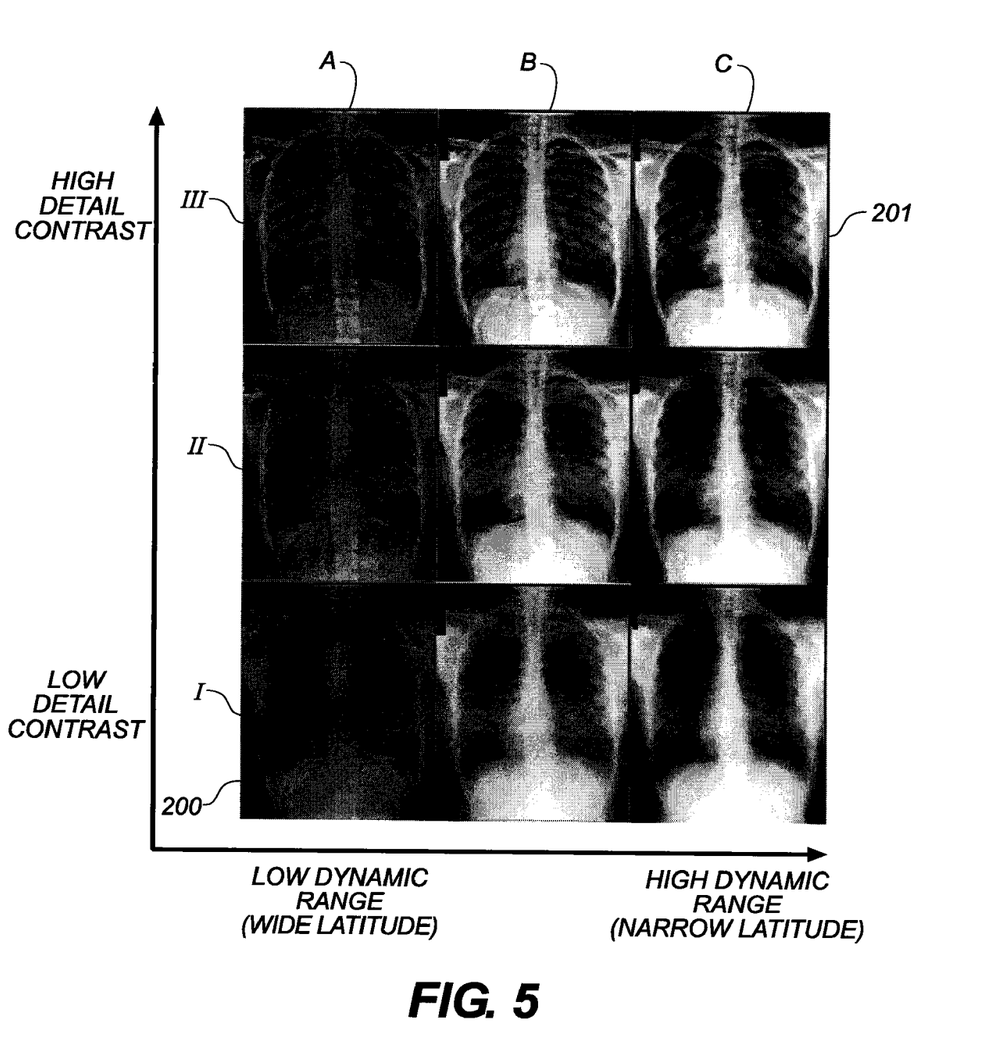
FIG. 5 is a diagrammatic view illustrating the independent control of detail contrast vs. dynamic range in the present invention.

By defining the dynamic range and detail contrast parameters in this way independent control of these attributes can be achieved. This is illustrated by FIG. 5. It shows a 3×3 matrix of images (i.e., IA, IB, IC, IIA, IIB, IIC, IIIA, IIIB, IIIC) processed using these controls. By moving from left to right (Image A and Image C) across a row (I, II, III) in the matrix, the dynamic range increases as the value of the dynamic range control is increased, while the detail contrast is held constant at a particular level. By moving from the bottom to top of the matrix along a column (A, B, C) the detail contrast increases as the value of the detail contrast control is increased while the dynamic range is held constant at a particular level. The image 200 (IA) in the bottom left corner has wide latitude and low detail contrast, while the image 201 (IIIC) in the upper right corner has narrow latitude and high detail contrast.

The controls for the sharpness of small features, sharpness ($B_0(i,j)$), and very fine features, fineDetail($B_0(i,j)$), are defined as follows $$\text{sharpness}(B_0(i,j)) = \frac{g_2(B_0(i,j))}{g_1(B_0(i,j))}$$

$$\text{fineDetail}(B_0(i,j)) = \frac{g_3(B_0(i,j))}{g_2(B_0(i,j))}$$

To achieve the independent control of sharpness/blurring, it is found that controlling the gain ratio between the frequency bands is important. The sharpness($B_0(i,j)$) parameter provides control of the sharpness of small detail in an image, and the fineDetail($B_0(i,j)$) parameter provides an extra level of control over the sharpness of very fine detail in an image.

The gain terms that are used to manipulated the frequency bands, $B_1$, $B_2$, and $B_3$ are derived from detail contrast, sharpness and fine detail controls respectively as follows $g_1(B_0(i,j))$=detailContrast($B_0(i,j)$)/dD/dx $g_2(B_0(i,j))$=sharpness($B_0(i,j)$)*$g_1(B_0(i,j))$ $g_3(B_0(i,j))$=fineDetail($B_0(i,j)$)*$g_2(B_0(i,j))$ The present invention enables exposure dependent control of the detailContrast($B_0(i,j)$), sharpness($B_0(i,j)$), and fineDetail($B_0(i,j)$). The low band image $B_0(i,j)$ represents the average log exposure and serves as a map of exposure regions in an image. To achieve exposure dependent control of the image enhancement, the parameters are defined as a function of that band. Areas of the low band image where the code values are low correspond to the low exposure regions in the image (that is the low density or bright areas in the image). Areas where the code values are high correspond to high exposure regions in the image (that is the high density or dark areas in the image). This information can be used to provide exposure dependent control of detail contrast, sharpness of edges, and sharpness of fine detail and to improve the enhancement of the image.

Figure 6A:
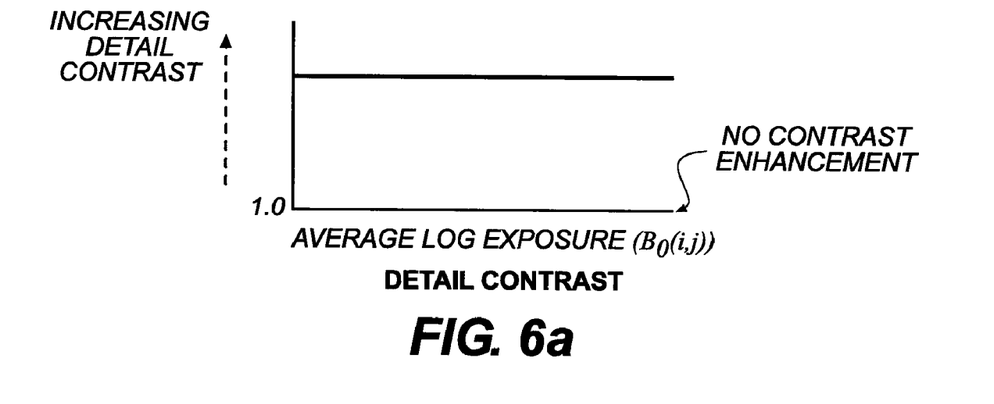
FIGS. 6a-6c are graphical views of functions to control detail, contrast, sharpness, and fine detail, respectively according to the present invention.
Figure 6B:
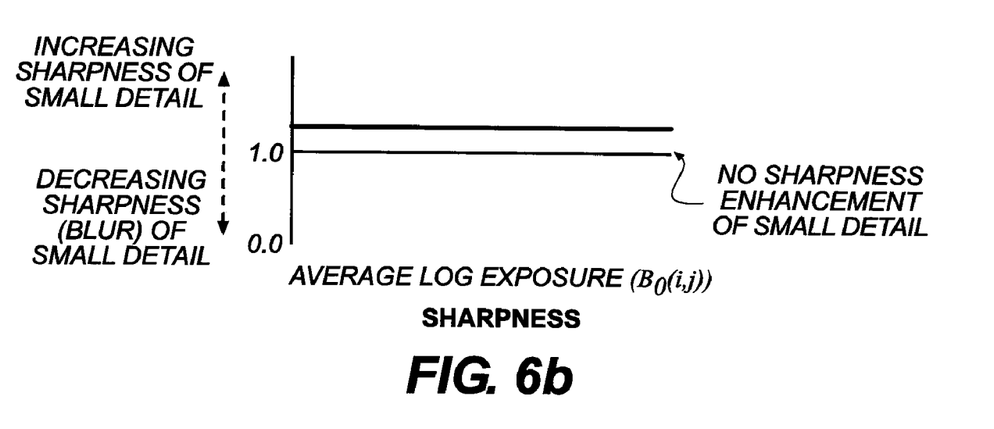
Figure 6C:
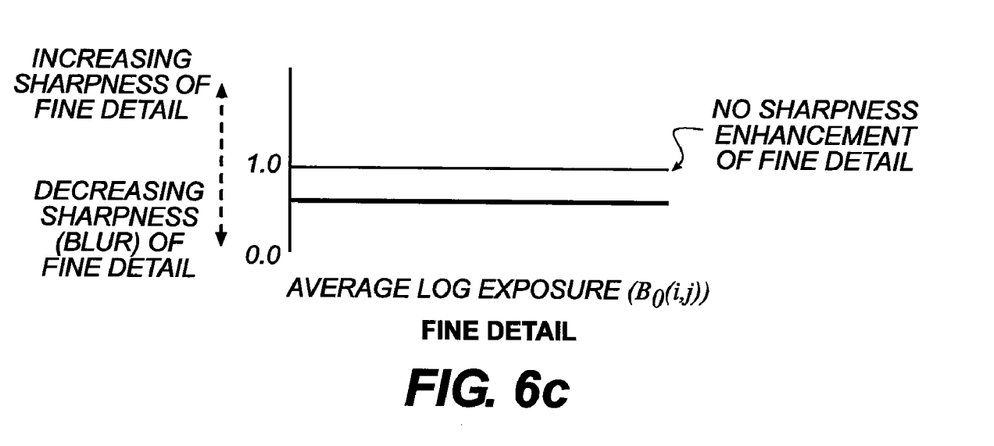

FIGS. 6a-6c show examples of a functional form of the detail contrast (FIG. 6a), sharpness (FIG. 6b), and fine detail (FIG. 6c) controls, respectively. In this example the function is constant across all exposure regions (exposure independent). When a control is set to a value of 1.0 there is no enhancement of features in the image. While a control value greater than 1.0 result in the enhancement of features in the image. Both the sharpness and the fine detail controls can have values less than 1.0 (but not negative). If these controls are set to a value less than 1.0, the corresponding features are blurred (the gain of these bands are decreased relative to the lower bands). Setting the fineDetail($B_0(i,j)$) control to a value less than 1.0 is used to reduce the appearance of high frequency noise in an image.

Figure 7A:
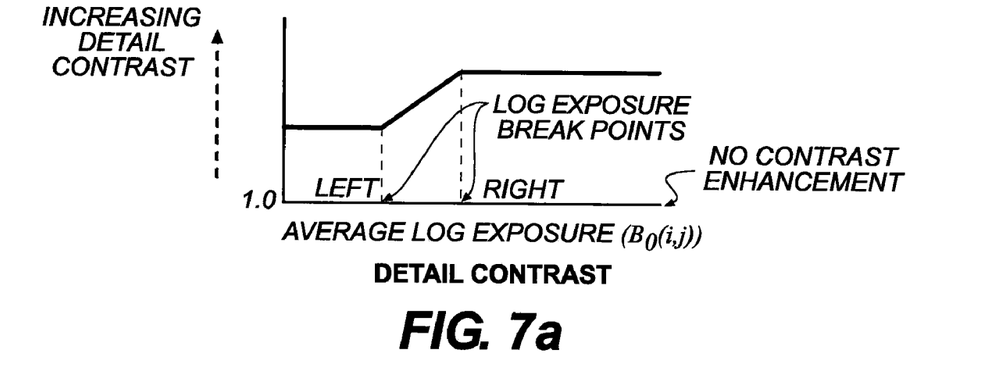
FIGS. 7a-7c are graphical views of log exposure dependent functions to control detail contrast, sharpness, and fine detail, according to the present invention respectively.
Figure 7B:
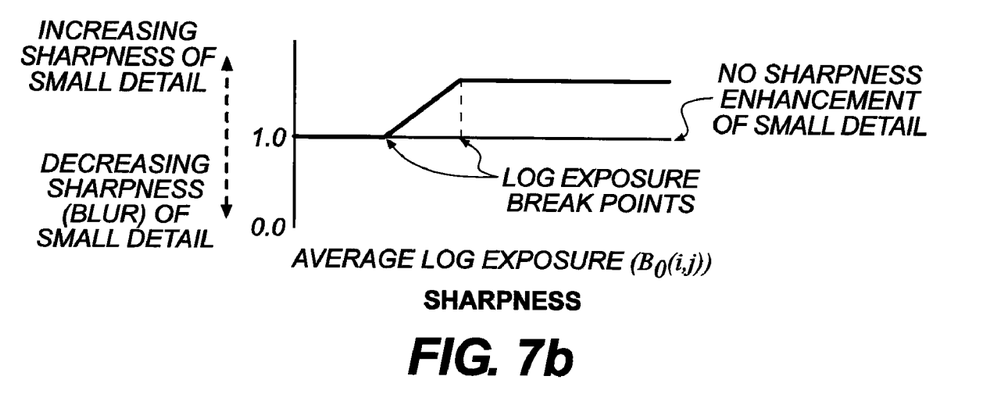
Figure 7C:
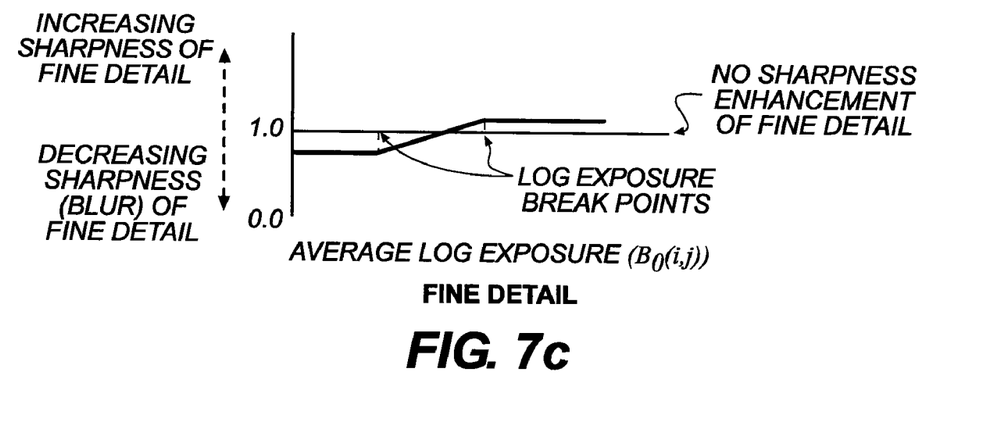

FIGS. 7a-7c shows an example of an exposure dependent functional form that can be used for detail contrast, sharpness and fine detail controls, respectively. The functional form is a piecewise linear curve in which two breakpoints are used. The function is parameterized by setting a left and right log exposure break point, and a left function value (for $B_0(i,j)$<=left break point) and a right function value (for $B_0(i,j)$>=right break point). The functional form between the breakpoints is linear.

Figure 8:
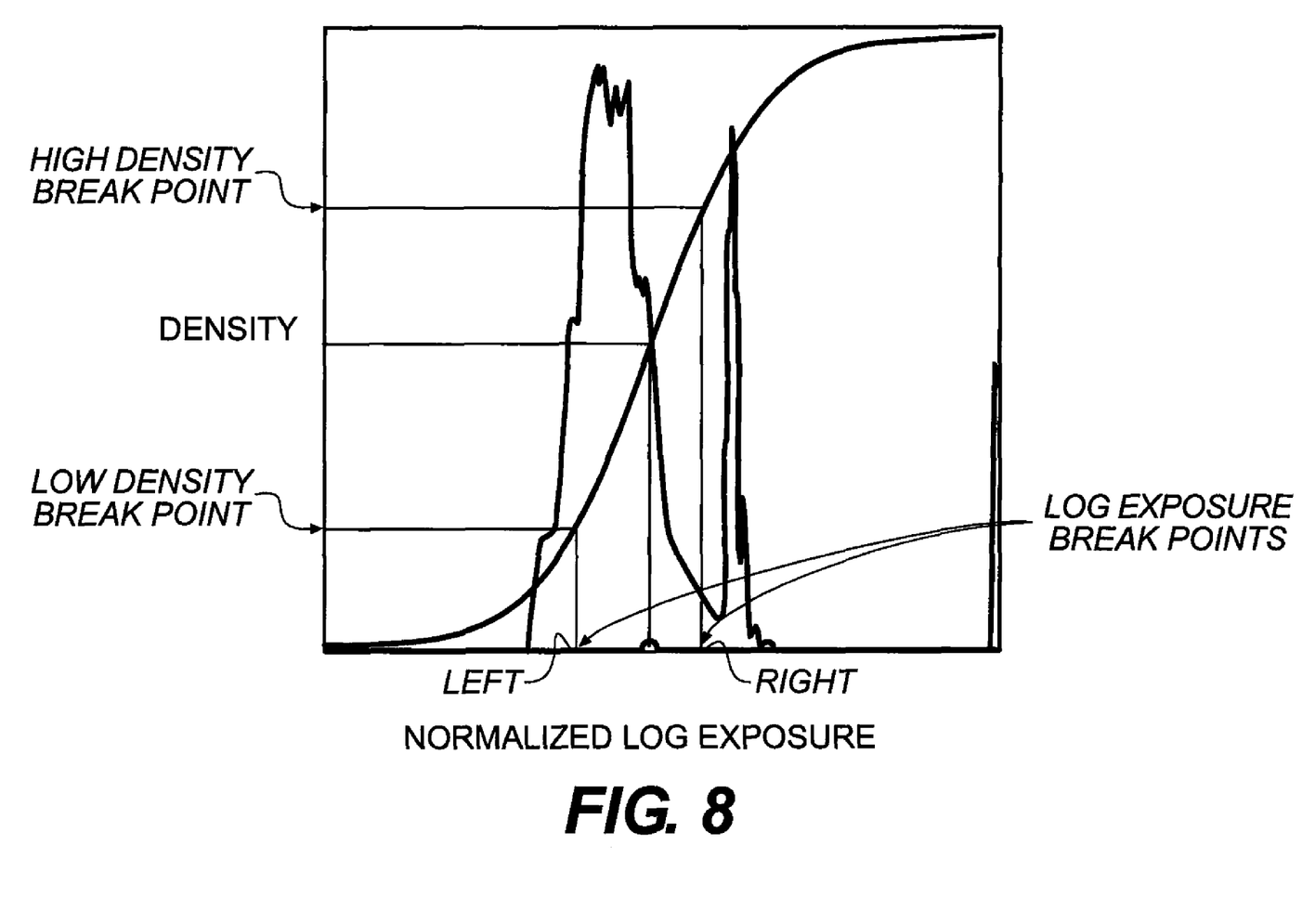
FIG. 8 is a graphical view showing the mapping of density breakpoints to log exposure break points according to the present invention.
Figure 9:
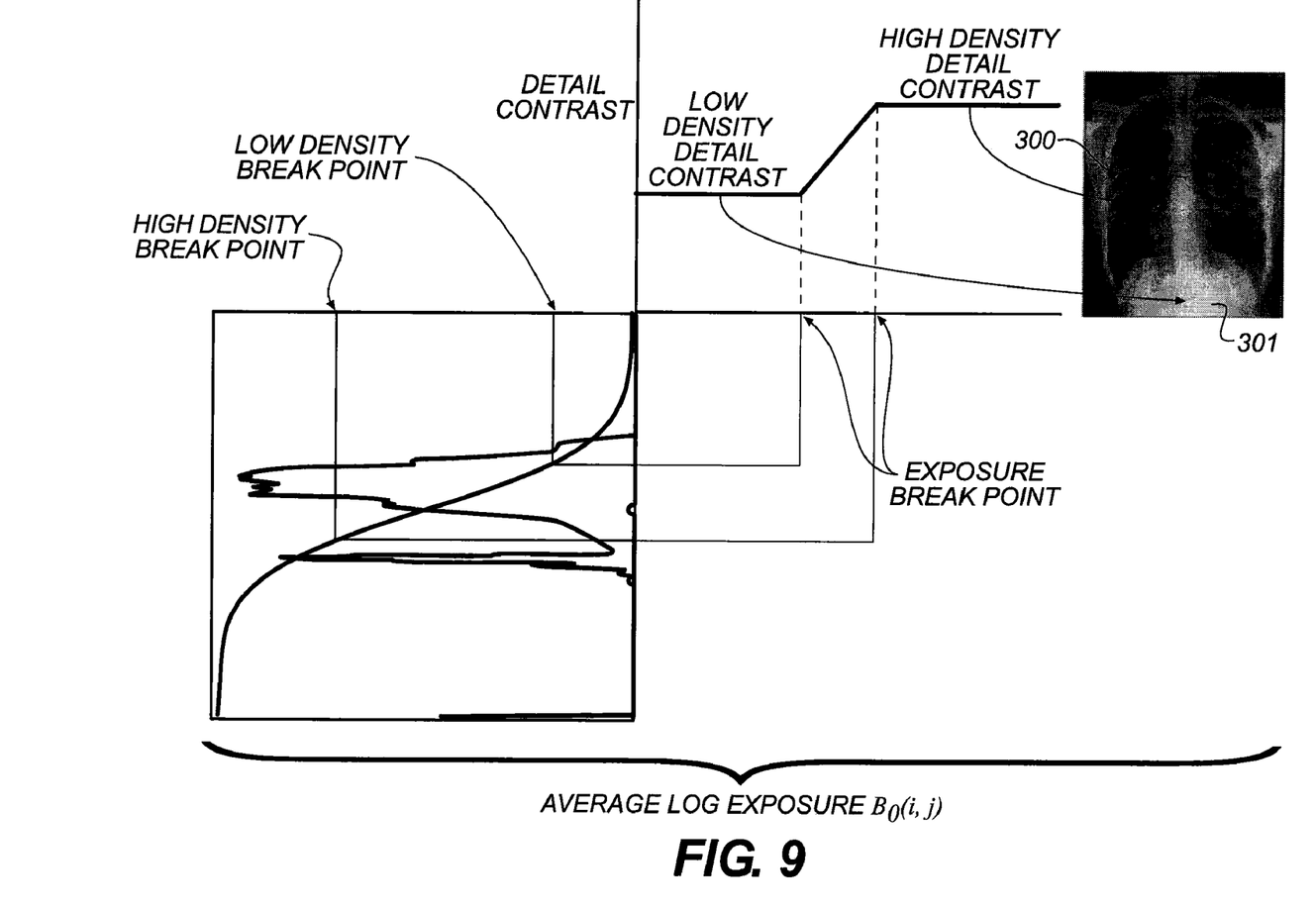
FIG. 9 is a diagrammatic view of density dependent control of the detail contrast according to the present invention.

As shown in FIG. 8, breakpoints can be first assigned in density and then mapped to log exposure breakpoints via the tone scale curve. The high-density breakpoint is mapped to the right log exposure breakpoint and the low-density breakpoint is mapped to the left log exposure breakpoint. Once the brightness and dynamic range of the image are set, via the tone scale, then the log exposure breakpoint are defined. Setting the breakpoint in density provides a mechanism to achieve a preferred rendering of density regions. Often they correspond directly to important anatomical structures in a radiographic image of an individual. For example, on a chest image the lung field is a higher density (darker) region and can be rendered differently from the diaphragm, which is in a lower density (brighter) region. As illustrated in FIG. 9, a user or image analysis algorithm can independently control the detail contrast (as well as sharpness of small and fine detail (or noise suppression)) in low and high-density areas of an image. For example the detail contrast can be set higher in the lung field areas 300 and lower in the lower density diaphragm area 301.

It will be evident to those skilled in the art that there are other useful functional forms that can be generated for the detailContrast($B_0(i,j)$), sharpness($B_0(i,j)$), and fineDetail($B_0(i,j)$) controls.

Figure 10:
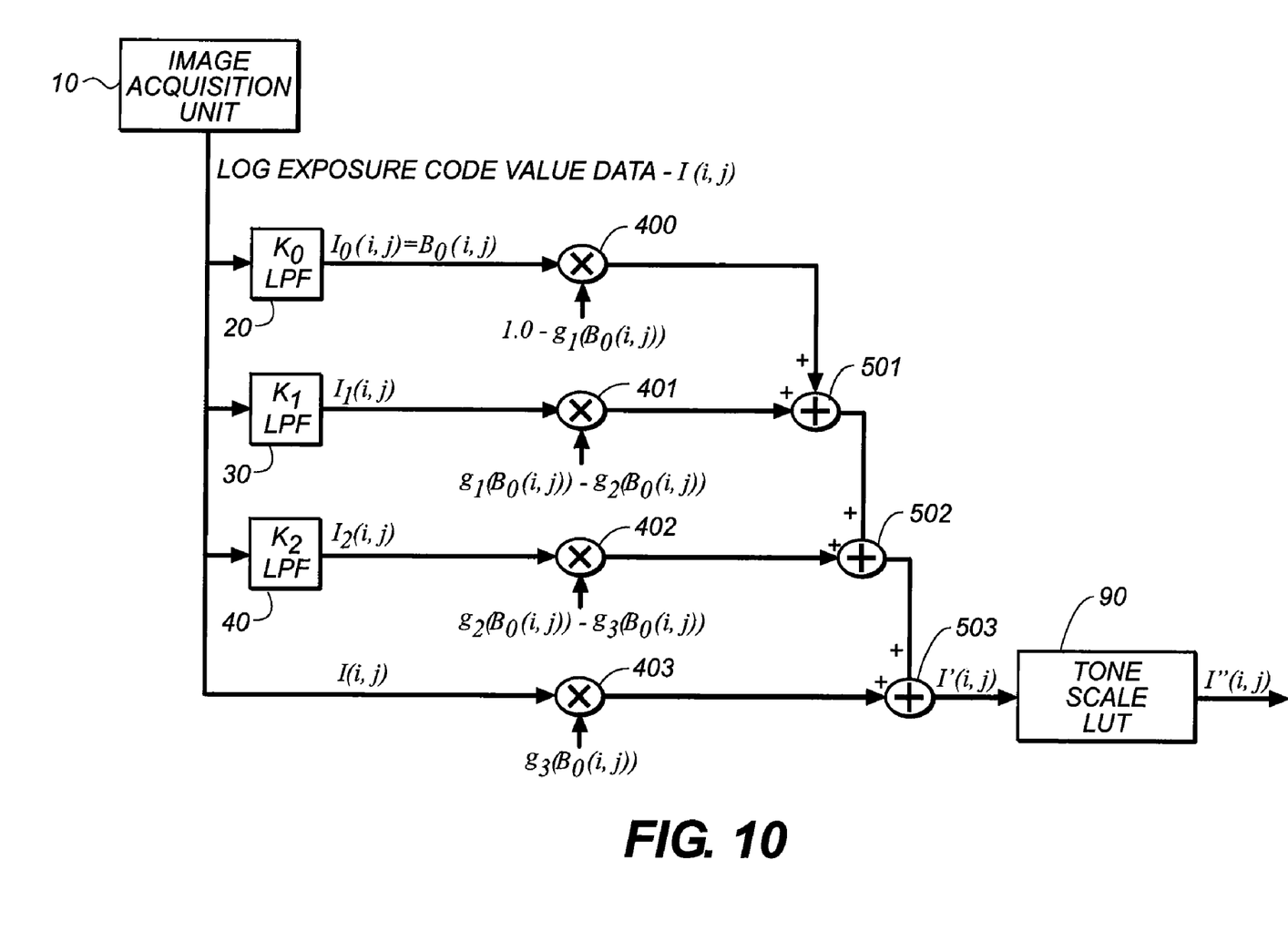
FIG. 10 is a flow diagram of another embodiment of the present invention.

Another embodiment of the present invention is shown in FIG. 10. In this embodiment, the original image I(i,j) from Inage acquisition unit 10 and the low-pass images (and not the frequency band images) (from low pass filter operators 20, 30, 40 are directly manipulated at multipliers 400, 401, 402, and 403, and the results are summed together at adders 501, 502, and 503 to generated the reconstructed image I'(i,j) which is expressed as $$I'(i,j)=g_3(I_0(i,j))I(i,j)+(1-g_1(I_0(i,j)))I_0(i,j)+(g_1(I_0(i,j))-g_2(I_0(i,j)))I_1(i,j)+(g_2(I_0(i,j))-g_3(I_0(i,j)))I_2(i,j)$$

This embodiment produces the same result as the method shown in FIG. 1 but does not require the calculation of the frequency band images and may be advantageous in some implementations.

It is a preferred embodiment of this invention that the brightness and dynamic range parameters and the parameters for the detailContrast($B_0(i,j)$), sharpness($B_0(i,j)$), and fineDetail($B_0(i,j)$) functions be either entered directly at a user interface to the algorithm or automatically determined via an image analysis method.

Figure 11:
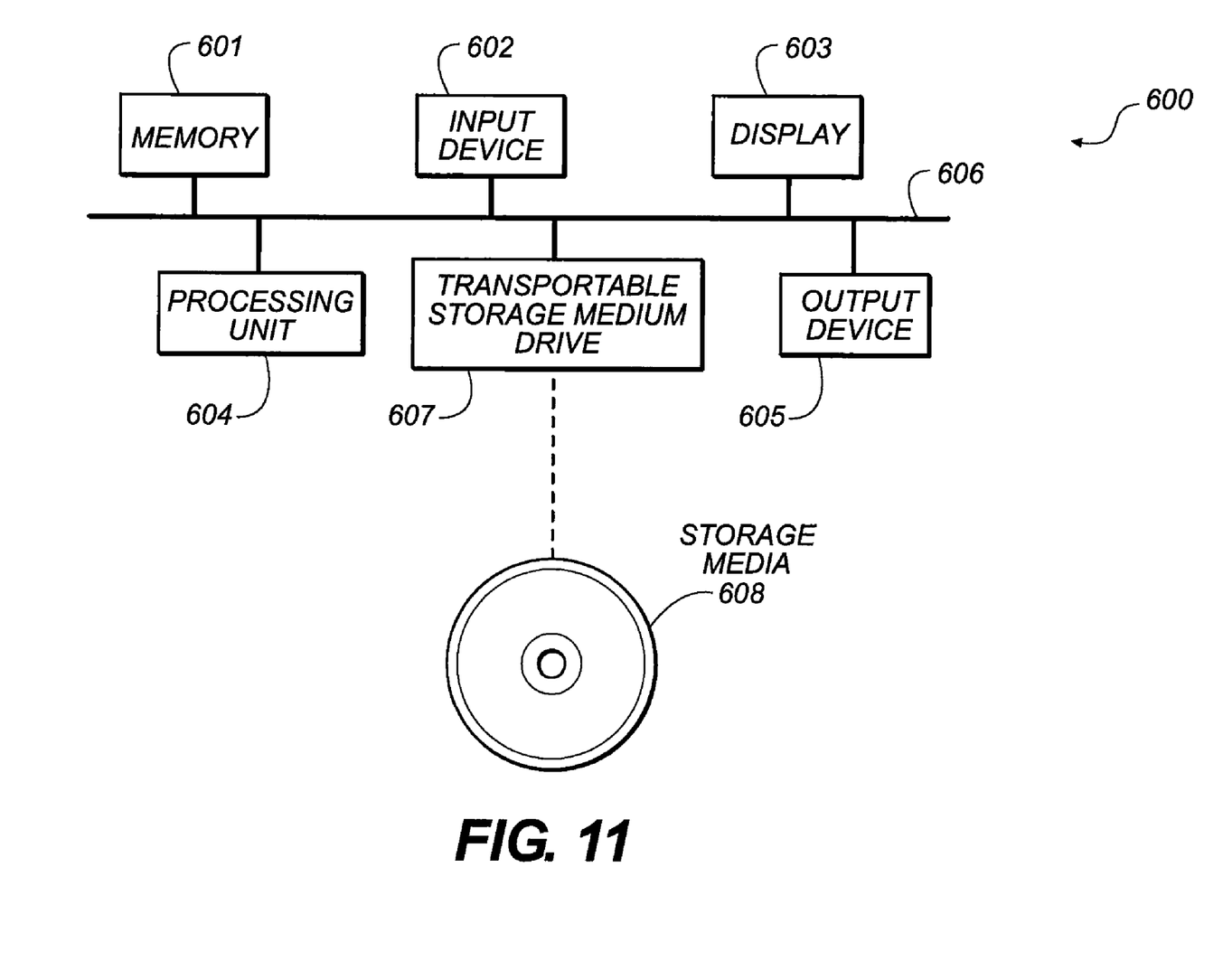
FIG. 11 is a block diagram of a digital image enhancement system for carrying out the present invention.

Referring now to FIG. 11, there is shown a digital computer 600 for carrying out the present invention. As shown, digital computer 600 includes memory 601 for storing digital images, application programs, operating systems, etc. Memory 601 can include mass memory (such as hard magnetic disc or CD ROM), and fast access memory (such as RAM). Computer 600 also includes input devices 602 (such as keyboard, mouse, touch screen) display 603 (CRT, Flat Panel Display), central processing unit 604, output device 605 (thermal printer, laser printer, etc.). Components 601, 602, 603, 604, and 605 are connected together by control/data bus 606. Computer 600 can include a transportable storage medium drive 607 for reading from and/or writing to transportable storage media 608, such as DVD or CD.

The invention has been described in detail with particular reference to certain preferred embodiments thereof, but it will be understood that variations and modifications can be effected within the spirit and scope of the invention.

PARTS LIST 10 image acquisition unit
20 low-pass operator using filter $K_0$
30 low-pass operator using filter $K_1$
40 low-pass operator using filter $K_2$
60,70,80 subtractor
61,71,81 multiplier
62,72,82 adder
90 tone scale process
91,92,93 gain terms
100 example tone scale function
200 low detail contrast and wide latitude image example
201 high detail contrast and narrow latitude image example
300 high-density lung field area
301 low-density diaphragm area
400-403 multiplier
501-503 adder
600 computer
601 memory
602 input device
603 display
604 processing unit
605 output device
606 control/data bus
607 transportable storage medium
608 storage media

What is claimed is:

1. A system for enhancing a digital image comprising:
   means for providing a digital image;
   means for decomposing the provided digital image into a multi-frequency band representation of four frequency bands as follows:
      a lowest frequency band image which represents large-sized features in the digital image;
      a low-to-mid frequency band image which represents mid-sized features of the digital image;
      a mid-to-high frequency band image which represents the small-sized features in the digital image; and
      a highest frequency band which represents very fine detail in the digital image;
   means for manipulating said low-to-mid frequency band image to produce a contrast effect without affecting the overall dynamic range of said digital image;
   means for multiplying each of said high-frequency band images with a gain factor;
   means for summing together said unmodified low frequency band image and said modified high-frequency band images to produce a reconstructed digital image; and
   means for mapping said reconstructed digital image through a tone-scale look-up table to map said reconstructed digital image to optical densities.

2. A system for enhancing a digital image comprising:
   means for providing a digital image;
   means for decomposing the provided digital image into a multi-frequency band representation of four frequency bands as follows:
      a lowest frequency band image which represents large-sized features in the digital image;
      a low-to-mid frequency band image which represents mid-sized features of the digital image;
      a mid-to-high frequency band image which represents the small-sized features in the digital image; and
      a highest frequency band which represents very fine detail in the digital image;
   means for multiplying each of said high-frequency band images with a gain factor; wherein said gain factor which multiplies said low-to-mid frequency band image is derived from a detail contrast control and a dynamic range control;
   means for summing together said unmodified low frequency band image and said modified high-frequency band images to produce a reconstructed digital image; and means for mapping said reconstructed digital image through a tone-scale look-up table to map said reconstructed digital image to optical densities.

3. The system of claim 2 wherein said detail contrast control is a function of said lowest frequency band image (which represents average log exposure).

4. The system of claim 3 wherein the functional form of said detail contrast control is a piecewise linear curve with breakpoints.

5. The system of claim 4 wherein said breakpoints are first assigned in density and then mapped to log exposure breakpoints via said tone-scale curve providing density dependent control of the detail contrast of said image.

6. The system of claim 2 wherein manipulation of said detail contrast control does not affect the overall dynamic range or sharpness of small or fine detail of said image.

7. A system for enhancing a digital image comprising:
means for providing a digital image;
means for decomposing the provided digital image into a multi-frequency band representation of four frequency bands as follows:
 a lowest frequency band image which represents large-sized features in the digital image;
 a low-to-mid frequency band image which represents mid-sized features of the digital image;
 a mid-to-high frequency band image which represents the small-sized features in the digital image; and
 a highest frequency band which represents very fine detail in the digital image;
means for multiplying each of said high-frequency band images with a gain factor; wherein said gain factor which multiplies said mid-to-high frequency band image is derived from a sharpness control and said gain factor which multiplies said low-to-mid frequency band image;
means for summing together said unmodified low frequency band image and said modified high-frequency band images to produce a reconstructed digital image; and
means for mapping said reconstructed digital image through a tone-scale look-up table to map said reconstructed digital image to optical densities.

8. The system of claim 7 wherein said sharpness control is a function of said lowest frequency band image (which represents average log exposure).

9. The system of claim 8 wherein the functional form of said sharpness control is a piecewise linear curve with breakpoints.

10. The system of claim 9 wherein said breakpoints are first assigned in density and then mapped to log exposure breakpoints via said tone-scale curve providing density dependent control of the sharpness of small detail of said image.

11. A system for enhancing a digital image comprising:
means for providing a digital image;
means for decomposing the provided digital image into a multi-frequency band representation of four frequency bands as follows:
 a lowest frequency band image which represents large-sized features in the digital image;
 a low-to-mid frequency band image which represents mid-sized features of the digital image;
 a mid-to-high frequency band image which represents the small-sized features in the digital image; and
 a highest frequency band which represents very fine detail in the digital image;
means for multiplying each of said high-frequency band images with a gain factor; wherein said gain factor which multiplies said highest frequency band image is derived from a fine detail control and said gain factor which multiplies the mid-to-high frequency band image;
means for summing together said unmodified low frequency band image and said modified high-frequency band images to produce a reconstructed digital image; and
means for mapping said reconstructed digital image through a tone-scale look-up table to map said reconstructed digital image to optical densities.

12. The system of claim 11 wherein said fine detail control is a function of the lowest frequency band image (which represents an average log exposure).

13. The system of claim 12 wherein the functional form of said fine detail control is a piecewise linear curve with breakpoints.

14. The system of claim 13 wherein said breakpoints are first assigned in density and then mapped to log exposure breakpoints via said tone scale curve providing density dependent control of the sharpness of the fine detail of said image.

15. A system for enhancing a digital image comprising:
means for providing a digital image;
means for decomposing the provided digital image into a multi-frequency band representation of four frequency bands as follows:
 a lowest frequency band image which represents large-sized features in the digital image;
 a low-to-mid frequency band image which represents mid-sized features of the digital image;
 a mid-to-high frequency band image which represents the small-sized features in the digital image; and
 a highest frequency band which represents very fine detail in the digital image;
means for multiplying each of said high-frequency band images with a gain factor; wherein said gain factors which multiply said higher frequency bands are a function of said lowest frequency band image;
means for summing together said unmodified low frequency band image and said modified high-frequency band images to produce a reconstructed digital image; and
means for mapping said reconstructed digital image through a tone-scale look-up table to map said reconstructed digital image to optical densities.

* * * * *